United States Patent [19]

Bell

[11] Patent Number: 5,178,101

[45] Date of Patent: Jan. 12, 1993

[54] LOW $NO_x$ COMBUSTION PROCESS AND SYSTEM

[75] Inventor: Ronald D. Bell, Austin, Tex.

[73] Assignee: Radian Corporation, Austin, Tex.

[21] Appl. No.: 848,120

[22] Filed: Mar. 9, 1992

[51] Int. Cl.$^5$ ............................ B09B 3/00; F22B 1/00
[52] U.S. Cl. .................................. 122/4 D; 110/212;
110/345; 422/182; 422/183
[58] Field of Search ............... 110/212, 213, 245, 344,
110/345; 122/4 D; 422/182, 183; 431/5

[56] References Cited

U.S. PATENT DOCUMENTS

| | | |
|---|---|---|
| 4,106,286 | 8/1978 | Sakai et al. . |
| 4,164,546 | 8/1979 | Welty, Jr. . |
| 4,354,821 | 10/1982 | Kesselring et al. . |
| 4,405,587 | 9/1983 | McGill . |
| 4,572,110 | 2/1986 | Haeflich . |
| 4,951,579 | 8/1990 | Bell ................................. 110/212 |
| 4,982,672 | 1/1991 | Belv ............................... 110/212 X |
| 5,022,226 | 6/1991 | Bell . |
| 5,048,432 | 9/1991 | Hofmann et al. ................ 110/345 |

*Primary Examiner*—Edward G. Favors
*Attorney, Agent, or Firm*—Klauber & Jackson

[57] ABSTRACT

A method and corresponding system are provided for reducing quantities of oxides of nitrogen, including $N_2O$, that are generated in a coal-fired fluidized bed boiler, the exhaust stream from the fluidized bed boiler being at a temperature of about 600°–650° F. and including from about 3 to 6% oxygen, from about 50 to 500 ppmv of $NO_x$ and from about 50 to 300 ppmv of $N_2O$. Pursuant to the invention, the exhaust stream is flowed through a thermal reaction zone at which fuel and air are burned, to provide a modified heated stream which includes small quantities of combustibles and of oxygen. The modified heated stream is passed over a first catalyst bed under overall reducing conditions, the quantity of oxygen in the stream being in stoichiometric excess of the amount of $NO_2O$ and $NO_x$, but less than the amount of said combustibles; whereby the $N_2O$ and $NO_x$ are first oxidized to $NO_2$, and then the $NO_2$ is reduced by the excess combustibles. The stream from the first catalyst bed is cooled by passing it through a heat exchanger. Air is added to the resulting stream from the heat exchanger to produce a further cooled stream having a stoichiometric excess of oxygen. The further cooled stream is then passed over an oxidizing catalyst bed to oxidize remaining excess combustibles, to thereby provide an effluent stream having environmentally safe characteristics.

14 Claims, 2 Drawing Sheets

LOW NO$_x$ COMBUSTION PROCESS AND SYSTEM

FIELD OF THE INVENTION

This invention relates generally to methods and apparatus for power generation, and more specifically relates to a process and system which employs a coal-fired fluidized bed boiler as the primary power source, while ensuring extremely low NO$_x$ and N$_2$O content in the final exhaust gases vented to ambient.

BACKGROUND OF THE INVENTION

Numerous of the combustion processes incident to power generation, generate as well as an undesired product, effluent gases having an unacceptable NO$_x$ content. More specifically, the high temperatures incident to the operation of fuel-driven turbines, internal combustion engines and the like, results in the fixation of some oxides of nitrogen. These compounds are found in the effluent gases mainly as nitric oxide (NO) with lesser amounts of nitrogen dioxide (NO$_2$) and only traces of other oxides. Since nitric oxide (NO) continues to oxidize to nitrogen dioxide (NO$_2$) in the air at ordinary temperatures, there is no way to predict with accuracy the amounts of each separately in vented gases at a given time. Thus, the total amount of nitric oxide (NO) plus nitrogen dioxide (NO$_2$) in a sample is determined and referred to as "oxides of nitrogen" (NO$_x$).

NO$_x$ emissions from stack gases, engine exhausts etc., through atmospheric reactions, produce "smog" that stings eyes and may cause or contribute to acid rain. Other deleterious effects both to health and to structures are believed to be caused directly or indirectly by these NO$_x$ emissions. For these reasons, the content of oxides of nitrogen present in gases vented to the atmosphere has been subject to increasingly stringent limits via regulations promulgated by various state and federal agencies.

To meet the regulations for NO$_x$ emissions, a number of methods of NO$_x$ control have previously been employed or proposed. In one approach water or steam are injected into the combustion zone. This lowers the flame temperature and thereby retards the formation of NO$_x$, since the amount of NO$_x$ formed generally increases with increasing temperatures. Water or steam injection, however, adversely affects the overall fuel efficiency of the process as energy is absorbed to vaporize the water or heat the injectable steam, which would otherwise go toward heating the power source exhaust and be ultimately converted into usable steam.

It is also known to inject ammonia to selectively reduce NO$_x$. A process involving the injection of ammonia into the products of combustion is shown, for example, in Welty, U.S. Pat. No. 4,164,546. Examples of processes utilizing ammonia injection and a reducing catalyst are disclosed in Sakari et al., U.S. Pat. No. 4,106,286; and Haeflich, U.S. Pat. No. 4,572,110. However, selective reduction methods using ammonia injection are expensive and somewhat difficult to control. Thus, these methods have the inherent problem of requiring that the ammonia injection be carefully controlled so as not to inject too much and create a possible emission problem by emitting excess levels of ammonia. In addition the temperature necessary for the reduction of the oxides of nitrogen must be carefully controlled to yield the required reaction rates.

Apparatus modifications have also been widely used or proposed as a solution to the aforementioned NO$_x$ emission problem. These include modifications to the burner or firebox to reduce the formation of NO$_x$. Although these methods can reduce the level of NO$_x$, each has its own drawbacks. Combustion equipment modifications can e.g. affect performance and limit the range of operation.

A selective catalytic reduction system is presently considered by some to be the best available control technology for the reduction of NO$_x$ from the exhaust gas of a cogeneration plant and, as a consequence, is often required equipment. Currently available selective catalytic reduction systems used for the reduction of NO$_x$ employ ammonia injection into the exhaust gas stream for reaction with the NO$_x$ in the presence of a catalyst to produce nitrogen and water vapor. Such systems typically have an efficiency of 80–90 percent when the exhaust gas stream is at a temperature within a temperature range of approximately 600°–700° F. The NO$_x$ reduction efficiency of the system is significantly less if the temperature is outside the stated temperature range and the catalyst may be damaged at higher temperatures.

A further approach to reducing NO$_x$ levels from combustion processes, is based on combustion staging. Thus a fuel-rich primary stage may be followed by secondary air addition and completion of combustion as a later stage.

Reference may be had in this connection to McGill et al., U.S. Pat. No. 4,405,587, for which the present Applicant is a co-patentee. As disclosed therein, oxides of nitrogen can be reduced by reaction in a reducing atmosphere at temperatures in excess of 2000° F., for example 2000° to 3000° F.

U.S. Pat. No. 4,354,821 is also of interest in disclosing a system for combusting a nitrogen-containing fuel in such a manner as to minimize NO$_x$ formation. The fuel to be combusted is directed through a series of combustion zones having beds of catalytic materials. Air is added to each of two upstream zones to provide fuel-rich conditions to thereby minimize formation of NO$_x$ precursors. In a final zone also having a bed of catalytic material, excess air is provided to complete combustion of the fuel.

In my U.S. Pat. No. 4,811,555, there is disclosed a cogeneration system wherein electrical power is generated by a gas turbine. The gaseous effluent from the turbine, together with sufficient additional fuel to produce a fuel-rich, fuel-air mixture is fed to a boiler to generate steam. Air is added to the gaseous effluent from the boiler to form a lean fuel-air mixture, and this mixture is passed over an oxidizing catalyst, with the resultant gas stream then passing to an economizer or low pressure waste heat boiler for substantial recovery of its remaining heat content. The gas, now meeting NO$_x$ emission standards, is then vented to atmosphere.

It will be appreciated that in my said U.S. Pat. No. 4,811,555, a gas turbine constitutes the primary power source. The NO$_x$ levels ultimately achieved therein are quite low, i.e. below about 50 ppmv for the final gases provided for venting. Since, however, NO$_x$ levels in the turbine exhaust are not extremely high to begin with (i.e. about 150 ppmv), the actual reduction is only moderate. Where an internal combustion engine (such as a diesel) constitutes the power source, NO$_x$ levels in the exhaust are an order of magnitude higher than in a gas turbine—a typical NO$_x$ level for such an engine being about 1500 ppmv. In this instance the exhaust stream also carries substantial particulate matter in the form of unburned carbon. It is found that with such a power source, neither the methods taught in my U.S. Pat. No. 4,811,555, or those otherwise known in the prior art are adequate or effective to economically and efficiently achieve fully acceptable $NO_x$ reduction.

In my U.S. Pat. No. 5,022,226, a cogeneration method and system is, however, provided wherein the primary power source is an internal combustion engine, and wherein the quantity of $NO_x$ in the fuel emissions to atmosphere is reduced to a completely safe and acceptable level. A cogeneration system is thus disclosed in said patent wherein fuel and oxygen are provided to an internal combustion engine connected to drive an electric generator, to thereby generate electricity. An exhaust stream is recovered from the engine at a temperature of about 500° to 1000° F. which includes from about 6 to 15 percent oxygen. Sufficient fuel is added to the exhaust stream to create a fuel-rich mixture, the quantity of fuel being sufficient to react with the available oxygen and reduce the $NO_x$ in the exhaust stream. The fuel-enriched stream is then provided to a thermal reactor means for reacting the fuel, $NO_x$ and available oxygen, to provide a heated oxygen-depleted stream. The oxygen-depleted stream is cooled in a heat exchanger. Prior to being passed over a catalyst bed under overall reducing conditions, conversion oxygen is added to the cooled stream. Such oxygen can be provided directly (i.e. as air), but preferably can be provided by bypassing part of the exhaust stream from the engine. The quantity of conversion oxygen is stoichiometrically in excess of the amount of $NO_x$ but less (stoichiometrically) than the amount of combustibles, in consequence of which $NO_x$ in the stream is oxidized to $NO_2$ at the forward end of the bed, after which the $NO_2$ is reduced in the remainder of the bed by the excess combustibles. Air is added to the resulting stream from the catalytic bed to produce a cooled stream having a stoichiometric excess of oxygen, and the stream is passed over a oxidizing catalyst bed to oxidize remaining excess combustibles. The resultant stream, vastly reduced in $NO_x$ content can then be provided for venting. The $NO_x$ content can be reduced to less than 25 ppmv—often below 15 ppmv, while CO levels are also brought to well below 50 ppmv.

The methodology of my aforementioned patents, including in U.S. Pat. No. 5,022,226, has thus shown promise as an emerging technology for the reduction of $NO_x$ from internal combustion engines and industrial boilers. In the instance of certain further types of power sources, however, notably including coal-fired fluidized bed boilers, a new consideration emerges, more specifically a need for simultaneous destruction of $NO_x$ and $N_2O$. The level of $N_2O$ from coal-fired fluidized bed boilers is in the range of 50–300 ppmv, and more typically 100–200 ppmv. This level is 10–20 times that found in the post flame products of other fuel-fired equipment such as conventional boilers and fired heaters. This may be attributed to the fact that a fluidized bed boiler is operated at lower combustion temperatures (<1700° F.) and utilizes a fuel containing bound nitrogen. It is thought that $N_2O$ may be formed by the partial oxidation of HCN (originating in the fuel-rich devolatilization zone in coal burning) by NO at lower temperatures. Nitrous oxide has been identified as a compound which not only acts as a greenhouse gas but also contributes to stratospheric ozone depletion. Evidence indicates that the concentration of $N_2O$ has been increasing in the atmosphere since the onset of industrialization. Thus a commensurate interest exists in reducing or eliminating discharge of $N_2O$ from power sources such as the mentioned fluidized bed boilers.

Current state of the art methods of $NO_x$ reduction such as catalytic and non-catalytic selective reduction using ammonia injection or "reburn" fuel/air staging have the desired results of reducing $NO_x$ but do not effectively reduce $N_2O$. In fact, in many cases the levels of $N_2O$ actually increase as a result of applying these technologies. It is therefore highly desirable to provide a method of $NO_x$ control that will simultaneously reduce $N_2O$ to very low levels.

In accordance with the foregoing, it may be regarded as an object of the present invention, to provide a method and system which are effective for reducing quantities of oxides of nitrogen, including $N_2O$ that are generated in operation of a coal-fired fluidized bed boiler, to levels which are safe and acceptable for discharge to atmosphere.

Another object of the invention is to provide a method and system of the foregoing character, which simultaneously provides for useful recovery of heat values which might otherwise be lost.

SUMMARY OF INVENTION

Now in accordance with the present invention, a method and corresponding system are provided for reducing quantities of oxides of nitrogen, including $N_2O$, that are generated in a coal-fired fluidized bed boiler, the exhaust stream from the fluidized bed boiler being at a temperature of about 600°–650° F. and including from about 3 to 6% oxygen, from about 50 to 500 ppmv of $NO_x$ (more typically 150–250 ppmv) and from about 50 to 300 ppmv of $N_2O$ (more typically 100–200 ppmv). Pursuant to the invention, the exhaust stream is flowed through a thermal reaction zone at which fuel and air are burned, to provide a modified heated stream which includes small quantities of combustibles and of oxygen. The modified heated stream is passed over a first catalyst bed under overall reducing conditions, the quantity of oxygen in the stream being in stoichiometric excess of the amount of $N_2O$ and $NO_x$, but less than the amount of said combustibles; whereby the $N_2O$ and $NO_x$ are first oxidized to $NO_2$, and then the $NO_2$ is reduced by the excess combustibles. The stream from the first catalyst bed is cooled by passing it through a heat exchanger. Air is added to the resulting stream from the heat exchanger to produce a further cooled stream having a stoichiometric excess of oxygen. The further cooled stream is then passed over an oxidizing catalyst bed to oxidize remaining excess combustibles, to thereby provide an effluent stream having environmentally safe characteristics.

A portion of the heat energy of the stream from the first catalyst bed is preferably converted into steam at the heat exchanger, for supplementing the steam from the boiler. Preferably as well, the effluent stream from the oxidizing catalyst bed is passed through an economizer where at least part of the heat energy of the effluent stream is used to preheat feed water for the boiler. The gaseous output stream from the economizer can then be passed through an air preheater for heat exchange with the feed air supporting the combustion at the boiler. The output stream from the air preheater can finally be vented, e.g. via a stack.

In a typical operation of the present invention, the effluent stream from the oxidizing catalyst bed contains less than 25 ppmv of $NO_x$, less than 20 ppmv of $N_2O$, less than 75 ppmv of CO, and less than 10 ppmv of $H_2$, and thus is completely acceptble for its subsequent discharge to atmosphere.

BRIEF DESCRIPTION OF DRAWINGS

The invention is diagrammatically illustrated, by way of example, in the drawings appended hereto, in which.

DESCRIPTION OF PREFERRED EMBODIMENT

Figure 1:
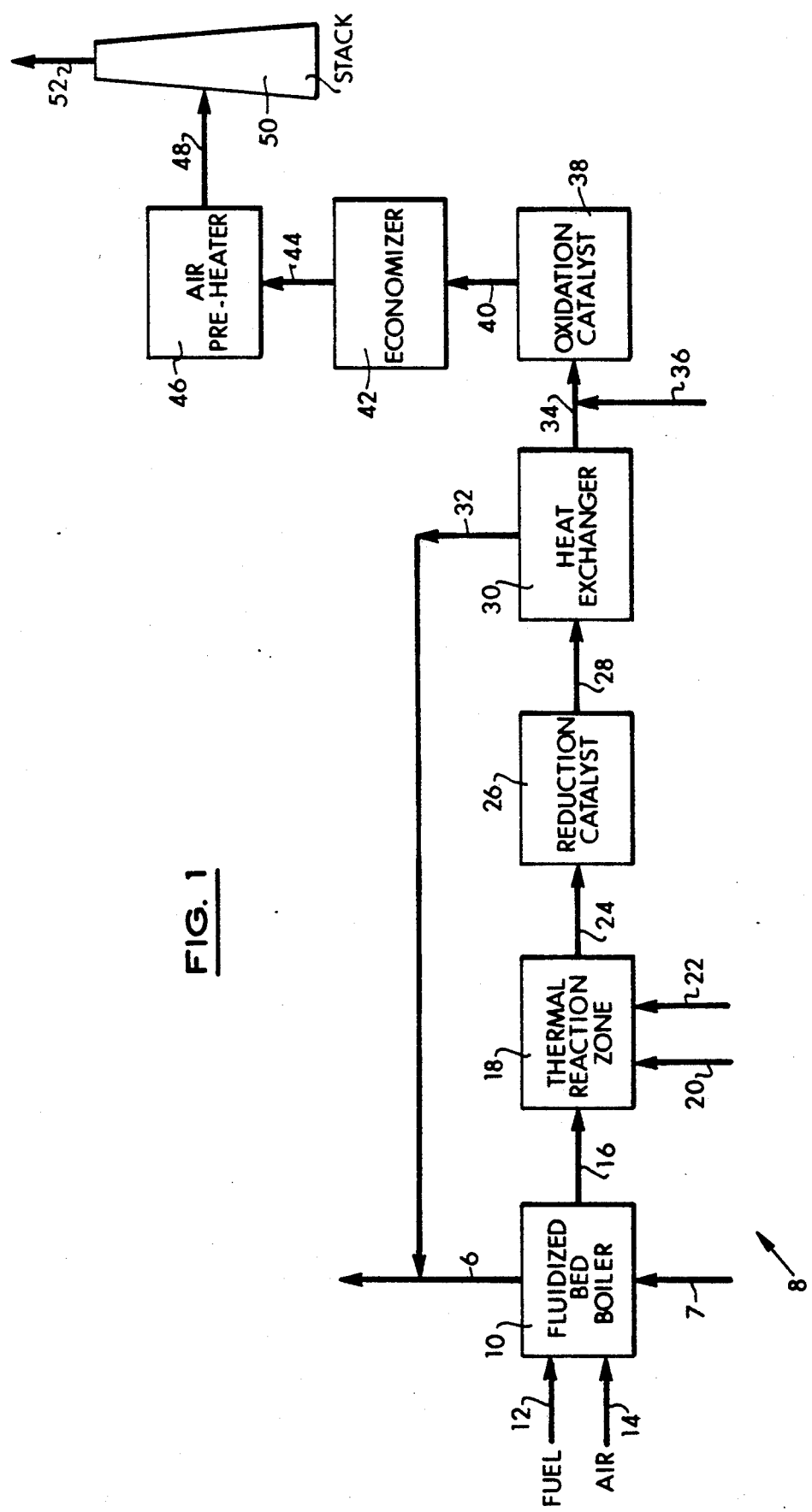
FIG. 1 is a schematic block diagram of a power system based upon a fluidized bed boiler, which incorporates the principles of the present invention.
Figure 2:
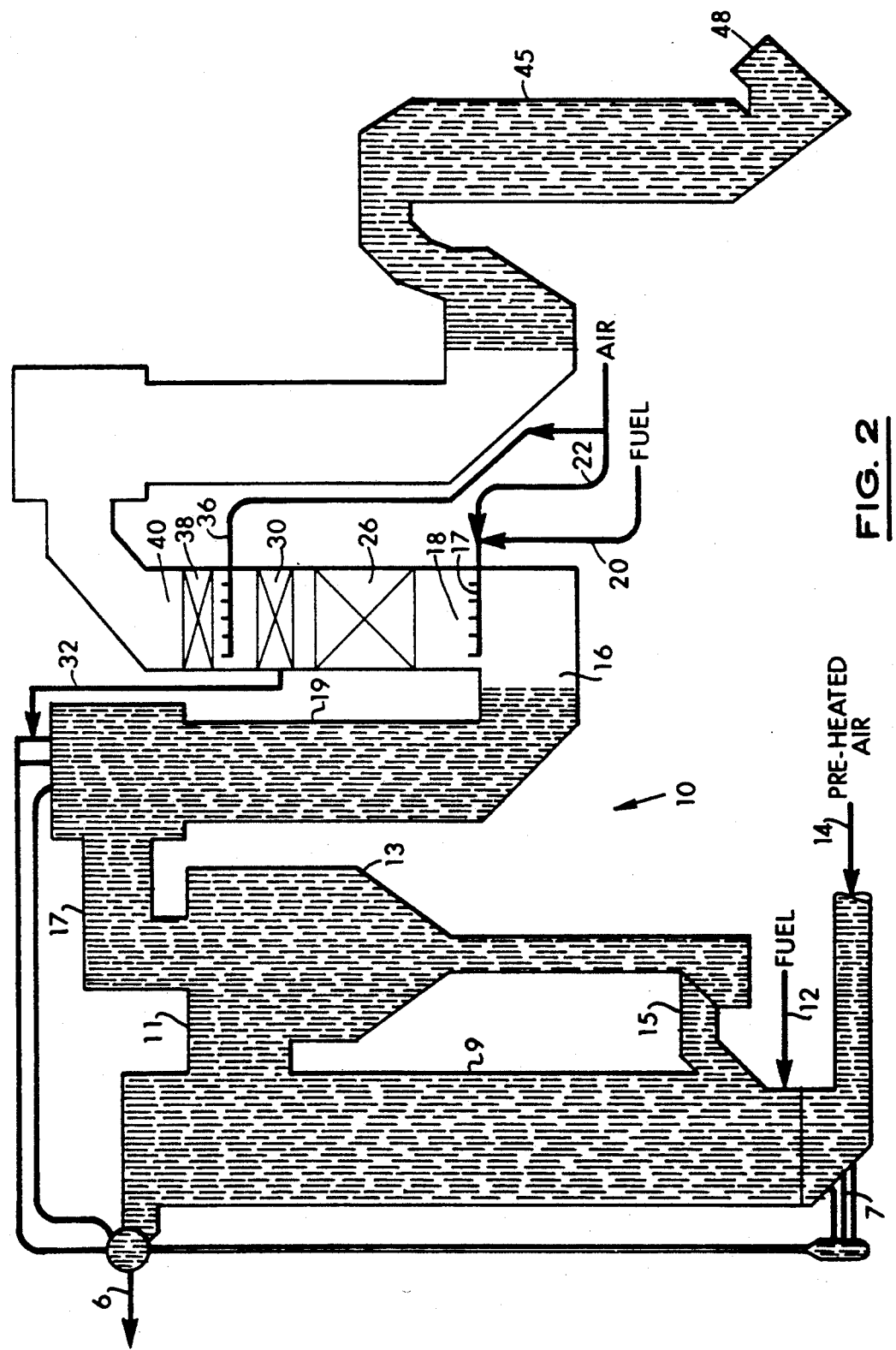
FIG. 2 is a schematic diagram of a coal-fired fluidized bed boiler which has been modified to incorporate the improvements of the present invention.

In connection with the ensuing description reference may usefully be had simultaneously to both FIG. 1 and 2. The former is a schematic block diagram of a power system based upon a coal-fired fluidized bed boiler which incorporates the principles of the present invention; while FIG. 2 is a schematic diagram of a coal-fired fluidized boiler which has been modified to incorporate the improvements of the invention. The showing of FIG. 1 is therefore, more general, in the sense that it renders clear that various types of coal-fired fluidized bed boilers may be combined in any convenient fashion with additional units as will hereinafter described in order to meet the requirements of the invention; whereas in the depiction of FIG. 2, the additional elements of the system are integrated with a particular type of fluidized-bed boiler, as will be seen. In order to simplify the ensuing discussion, corresponding portions of FIGS. 1 and 2 are designated by corresponding reference numerals. In the depiction of FIG. 2, the portions of the fluidized bed boiler which are conventional in the prior art have been depicted in shading in order to clearly differentiate same from the modifications that are introduced in the unit by virtue of the present invention.

Referring, therefore, to the Figures in the manner alluded to, a power system 8 is shown, the basic power-producing device for which comprises a coal-fired, fluidized-bed boiler 10 which produces a steam output at line 6, (FIG. 1) which typically is utilized to drive a steam turbine in the course of producing electric power. The steam output may similarly be used for other purposes, as for example, directly in the course of heating, or the like. Fuel and air (the latter may be preheated) are introduced via lines 12 and 14 respectively. It may be assumed for present purposes that the fuel is a coal, which typically for this type of device is introduced in a particulate form, which can result from external grinding or the like. Fluidized-bed boilers are well-known devices, one type of which is available from the Pyropower Corporation of San Diego, CA.

Referring to FIG. 2, the said device typically may include a fluid-bed combustion chamber, designated at 9, which is provided with radiant wall tubes (not shown), through which boiler feed water from a source 7 may pass. Adjoined to section 9 through a duct 11 is a cyclone section 13 which captures entrained bed material and recycles same for further burning by a return duct 15. A duct 17 is provided for the hot gases to advance to the convection section 19. The temperature at the output of this convection section, i.e., in line 16 of FIG. 1, is in the range of 600° F. to 650° F., which is a rather low temperature in comparison to internal combustion engines or the like. Oxygen content in line 16 (corresponding to the similarly numbered duct in FIG. 2) is the range of 3 to 6 weight percent, with 3.5% being a typical value. Because of the nature of the fuel and the combustion conditions of the fluidized-bed boiler, it is found that $NO_x$ levels can be in the broad range of 50 to 500 ppmv, typically are of the order of 150 to 250 ppmv, with a very typical value being 200 ppmv. At the same time, a characteristic feature of the present type of boiler is the generation of high $N_2O$ levels. These can be from about 50 to 300 ppmv, but generally are in the range of 100 to 200 ppmv, with 150 ppmv being typical. The content of combustibles, namely of CO and of $H_2$ in line 6, will, however, be negligible.

Pursuant to the present invention, the output in line 16 is first provided to a thermal reaction zone, designated at 18. Fuel 20 and air 22 are provided to this zone to provide combustion. The fuel can be any hydrocarbon fuel, such as gasoline, diesel oil, natural gas, naphtha and the like. Natural gas, however, is preferred. FIG. 2 shows at zone 18 a schematic depiction of a burner 17 at which the combined fuel and air can be burned. At the output end of the thermal reaction zone, i.e., at line 24 in FIG. 1, the temperature of the stream has risen to 850° F. to 900° F. The oxygen content has not been markedly changed, typically remaining at a level of about 3 to 6 weight percent, with 4.0% being typical. $NO_x$ levels have been modified to about 10 ppmv and $N_2O$ to approximately 20 ppmv. However, small quantities of combustibles, namely of CO and of $H_2$ are now present in the stream. Typical levels of the CO are 0.5 to 1.0% and the $H_2$ 0.25 to 0.5%.

The heated stream at line 24 is now flowed to a catalyst bed 26 which overall is a reduction catalyst. The amount of oxygen that remains in stream 24 is such as to be stoichiometrically in excess of the amount of $NO_x$ in such stream, but less stoichiometrically than the amount of combustibles (chiefly fuel) in the stream. Bearing in mind that the $NO_x$ in line 24 is chiefly in the form of NO, as the mix enters the front end of the catalyst bed 26 the $O_2$ reacts with the NO to predominantly convert same to $NO_2$. The latter being more unstable and reactive than NO, is then readily reduced to innocuous compounds by the excess combustibles as the flow proceeds through the remainder of the bed. This action is facilitated, if not enabled, by the fact that the stream entering the reduction catalyst bed is sufficiently cool. Were the gas stream at an elevated temperature, the initial conversion of NO to the more reactive $NO_2$ would not proceed to the extent necessary to enable the reaction just described—i.e., such high temperatures would favor disassociation of $NO_2$ back into the more stable form of NO.

The overall reaction in reduction catalyst bed 26 is therefore seen to be a reducing one, wherein the somewhat fuel-rich stream at a temperature of about 850°-900° F. is passed over a reducing catalyst, e.g. platinum-rhodium in the zero valent state, supported on a carrier such as alumina, silica or a metal alloy. The making of such catalysts is well-known to persons skilled in the art and known noble metal catalysts such as blends of palladium, platinum and rhodium can be used, as well as MnO and other metal oxides. These can be in the familiar pellet, ribbon, honeycomb or other forms. Catalyst volumes will vary depending upon the particular catalyst used. Ordinarily, the quantity of catalyst and flow rate are such that the space velocity is typically in the range of 30,000 to 40,000 hr$^{-1}$ typically being 35,000 hr$^{-1}$.

The stream exiting from catalyst bed 26 in conduit 28 is found as a result of the forgoing actions to be remarkable low in NO$_x$, typically including under 15 ppmv of same, 10 to 15 ppmv being typical. Further, the N$_2$O content has been reduced to about 10 ppm. However, CO is about 1.3% and H2 is typically about 0.7 weight percent.

The temperature of the stream exiting from catalyst bed 26 is slightly higher than that in the input line 24, being in the general range of about 850°-1000° F. This stream in line 28, in accordance with a further aspect of the invention, is preferably provided to a convection heat exchanger 30 through which water is passed as a cooling media and thereby transformed into steam in line 32. This steam can be recycled back to and joined with the steam line 6 from the fluidized-bed boiler 10 and used for power generation and heating purposes or the like. The stream output from the heat exchanger at line 34 will be at an approximate temperature of 500°-600° F. Air is added into line 34 from an input line 36, which may provide some modest cooling but also assures good mixing of the components of this stream. The stream 34 is then provided to an oxidation catalyst bed 38 wherein the gas stream is passed over an oxidizing catalyst. The amount of air added at line 36 relative to the stream, is such that the resulting stream will contain oxygen stoichiometrically in excess to the amount needed to burn any fuel which may be present in the stream, and will preferably be controlled so that the O$_2$ content in conduit 40 downstream of bed 38 will be about 1.3-5%. Either noble metal catalysts, such as platinum, palladium or rhodium; or base metal oxides, such as copper oxide, chrome oxide or manganese oxide, or the like, may be used for this purpose. The noble metal catalysts, e.g. platinum or palladium catalysts, are most suitably noble metals deposited in the zero valent state upon a support, such as alumina, silica, kiesel-guhr, or a metal alloy and the like. The metal oxide catalysts are also most suitably the metal oxides supported on supports of this character. Various shapes such as pellets, ribbons or honeycombs can be used. The making of such catalysts is well-known to persons skilled in the art. Catalyst volumes will vary depending on the particular catalyst used. Ordinarily the quantity of catalyst and flow rate are such that the space velocity is generally in the range of 50,000 to 80,000 hr$^{-1}$—65,000 hr$^{-1}$ is a typical value. O$_2$ levels in the conduit 40 are found to be of the order of 1 to 4%, 2% being typical. NO$_x$ levels are 20 to 25 ppmv; N$_2$O levels are typically 15 to 20; and CO levels have been reduced to 50 to 75 ppmv, while H$_2$ levels are less than 10 ppmv.

It should be emphasized that the heat exchanger 30 which is positioned between the catalyst beds 26 and 38, serves to reduce or to minimize the oxidation of ammonia to form NO$_x$. This has been found useful in that it has been found that while substantially all of the NO$_x$ is reduced in passage over the reduction catalyst, by-product ammonia can be formed and will then be oxidized and cause the oxidation catalyst to reform NO$_x$. By cooling the effluent stream from the reduction catalyst 26 to the 500° to 600° F. range indicated prior to the catalytic oxidation, the oxidation of ammonia to form NO$_x$ is minimized.

The gases exiting in line 40 can be further treated by being passed through an economizer 42 which is a conventional heat exchanger. The cooling media in same can be a water stream which is then provided to the boiler 10 so that the effect is to preheat the boiler feed water 7. The further cooled gases exiting in line 44 from the economizer can then be provided further to an air preheater 46, a further heat exchanger, in which the cooling media may be the air which is then provided to line 14 as an input to the fluidized bed boiler 10. Economizer 42 and air preheater 46 are conventionally present at section 45 of the boiler 10 in FIG. 2. Section 45 is shown in shading to indicate that these elements are or have been previously incorporated into the prior art construction of such a fluidized bed boiler.

The output in line 48 from air preheater 44 can finally be provided to a stack 50 for final emission at 52 with the assurance that the vented effluent will comply with both NO$_x$ and CO emission standards, as well as having a markedly low content of nitrous oxide, i.e. N$_2$O.

It will be understood in view of the foregoing disclosure that various changes may now be made by those skilled in the art without yet departing from the invention as defined in the appended claims; and it is therefore intended that all matter contained in the foregoing description and in the drawings shall be interpreted as illustrative and not in a limiting sense.

What is claimed is:

1. A method for reducing quantities of oxides of nitrogen, including N$_2$O, that are generated in a coal-fired fluidized bed boiler, the exhaust stream from said fluidized bed boiler being at a temperature of about 600°-650° F. and including from about 3 to 6 weight % oxygen, from about 50 to 500 ppmv of NO$_x$ and from about 50 to 300 ppmv of N$_2$O; said method comprising:

flowing said exhaust stream through a thermal reaction zone at which fuel and air are burned, to provide a modified heated stream which includes small quantities of combustibles and of oxygen;

passing said modified heated stream over a first catalyst bed under overall reducing conditions, the quantity of oxygen in said stream being in stoichiometric excess of the amount of N$_2$O and NO$_x$, but less than the amount of said combustibles; whereby the N$_2$O and NO$_x$ are first oxidized to NO$_2$, and then the NO$_2$ is reduced by the excess combustibles;

cooling the stream from said first catalyst bed by passing same through a heat exchanger;

adding air to the resulting stream from said heat exchanger to produce a further cooled stream having a stoichiometric excess of oxygen; and passing said further cooled stream over an oxidizing catalyst bed to oxidize remaining excess combustibles, to thereby provide an effluent stream having environmentally safe characteristics.

2. A method in accordance with claim 1, wherein said exhaust stream includes from about 150 to 250 ppmv of NO$_x$ and from about 100 to 200 ppmv of N$_2$O.

3. A method in accordance with claim 2, further including converting a portion of the heat energy of the stream from said first catalyst bed into steam at said heat exchanger, for supplementing the steam from said boiler.

4. A method in accordance with claim 3, wherein the effluent stream from said oxidizing catalyst bed is passed through an economizer where at least part of the heat energy of said effluent stream is used to preheat said boiler feed water.

5. A method in accordance with claim 4, wherein the output stream from said economizer is passed through an air preheater for heat exchange with the feed air for the combustion at said boiler, to thereby preheat said feed air.

6. A method in accordance with claim 2, wherein the effluent stream from said oxidizing catalyst bed contains less than 25 ppmv of $NO_x$ and less than 20 ppmv of $N_2O$.

7. A method in accordance with claim 6, wherein said effluent stream contains less than 75 ppmv of CO and less than 10 ppmv of $H_2$.

8. In combination with a coal-fired fluidized bed boiler, the exhaust stream from said fluidized bed boiler being at a temperature of about 600°–650° F. and including from about 3 to 6 weight % oxygen, from about 50 to 500 ppmv of $NO_x$, and from about 50 to 300 ppmv of $N_2O$; a system for reducing the quantities of oxides of nitrogen, including $N_2O$, that are present in said exhaust stream said system comprising:

a thermal reaction zone at which fuel and air are burned, said zone being connected to receive said exhaust stream and provide a modified heated stream which includes small quantities of combustibles and of oxygen;

a first catalyst bed for receiving and passing the modified heated stream, said bed operating under overall reducing conditions, the quantity of oxygen in said stream being in stoichiometric excess of the amount of $N_2O$ and $NO_x$, but less than the amount of said combustibles; whereby the $N_2O$ and $NO_x$ are first oxidized to $NO_2$, and then the $NO_2$ is reduced by the excess combustibles;

heat exchanger means for receiving, passing and cooling the stream from said first catalyst bed;

means for adding air to the resulting stream from said heat exchanger to produce a further cooled stream having a stoichiometric excess of oxygen; and an oxidizing catalyst bed for receiving and passing said further cooled stream over an oxidizing catalyst to oxidize remaining excess combustibles, to thereby provide an effluent stream having environmentally safe characteristics.

9. A system in accordance with claim 8, wherein said exhaust stream includes from about 150 to 250 ppmv of $NO_x$ and from about 100 to 200 ppmv of $N_2O$.

10. A system in accordance with claim 9, further including means for converting a portion of the heat energy of the stream from said first catalyst bed into steam at said heat exchanger, for supplementing the steam from said boiler.

11. A system in accordance with claim 10, further including an economizer, the effluent stream from said oxidizing catalyst bed being passed through said economizer where at least part of the heat energy of said effluent stream is used to preheat feed water for said boiler.

12. A system in accordance with claim 11, further including an air preheater, the output stream from said economizer being passed through said air preheater for heat exchange with the feed air for the combustion at said boiler, to thereby preheat said feed air.

13. A system in accordance with claim 9, wherein the effluent stream from said oxidizing catalyst bed contains less than 25 ppmv of $NO_x$ and less than 20 ppmv of $N_2O$.

14. A system in accordance with claim 13, wherein said effluent stream contains less than 75 ppmv of CO and less than 10 ppmv of $H_2O$.

* * * * *